US010166976B2

(12) United States Patent
Cheaz et al.

(10) Patent No.: US 10,166,976 B2
(45) Date of Patent: Jan. 1, 2019

(54) CONNECTION OF AN AUTONOMOUS VEHICLE WITH A SECOND VEHICLE TO RECEIVE GOODS

(71) Applicant: International Business Machines Corporation, Armonk, NY (US)

(72) Inventors: Nixon Cheaz, Cary, NC (US); William T. Cochran, Cary, NC (US); Anthony M. Diaz, Durham, NC (US); Bradley M. Segobiano, Efland, NC (US)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 15/217,461

(22) Filed: Jul. 22, 2016

(65) Prior Publication Data

US 2018/0025635 A1    Jan. 25, 2018

(51) Int. Cl.
*G08G 1/0965* (2006.01)
*G08G 1/0968* (2006.01)
(Continued)

(52) U.S. Cl.
CPC ........... *B60W 30/00* (2013.01); *G05D 1/0293* (2013.01); *G05D 1/0297* (2013.01); *G05D 2201/0213* (2013.01)

(58) Field of Classification Search
CPC ........... G08G 1/0965; G08G 1/096775; G08G 1/096827; B60W 30/00; G05D 1/0297;
(Continued)

(56) References Cited

U.S. PATENT DOCUMENTS

| 7,798,449 B2 * | 9/2010 | Small | B64C 39/024 |
| | | | 244/1 TD |
| 2009/0045290 A1 * | 2/2009 | Small | B64C 39/024 |
| | | | 244/135 A |

(Continued)

OTHER PUBLICATIONS

Miller, R. "Watch Tesla's creepy 'solid metal snake' plug itself into a Model S", retrieved from http://www.theverge.com/2015/8/6/9109027/tesla-model-s-snake-charger-elon-musk; Aug. 2015.
(Continued)

*Primary Examiner* — Anne M Antonucci
(74) *Attorney, Agent, or Firm* — Brown & Michaels, PC; Robert Shatto

(57) ABSTRACT

Connecting a first autonomous vehicle with a second vehicle to control the second vehicle during the transfer of goods to the first autonomous vehicle while moving. The first autonomous vehicle: receives a request from the second vehicle to connect to the second vehicle; initiates control over the second vehicle, such that the first autonomous vehicle synchronizes driving control with the second vehicle; initiates physical connection of the first autonomous vehicle with the second vehicle for transfer of the goods when the first and the second vehicles are in motion; after the physical connection between the first and the second vehicle is established, initiating transfer of the goods from the second vehicle to the first autonomous vehicle; and when the transfer of goods between the first and the second vehicle is complete, the first autonomous vehicle breaking the connection with the second vehicle and relinquishing control of the second vehicle.

20 Claims, 4 Drawing Sheets

(51) Int. Cl.
*G05D 1/00* (2006.01)
*G05D 1/02* (2006.01)
*G08G 1/0967* (2006.01)
*B60W 30/00* (2006.01)

(58) Field of Classification Search
CPC .... G05D 1/021; G05D 1/0094; G05D 1/0088; G05D 1/0276; G05D 2201/0216
See application file for complete search history.

(56) References Cited

U.S. PATENT DOCUMENTS

| | | | |
|---|---|---|---|
| 2010/0321011 A1* | 12/2010 | Small | B64C 39/024 324/239 |
| 2012/0200259 A1 | 8/2012 | Sullivan et al. | |
| 2014/0142840 A1 | 5/2014 | Spinelli et al. | |
| 2015/0006005 A1 | 1/2015 | Yu et al. | |
| 2015/0336502 A1 | 11/2015 | Hillis et al. | |
| 2015/0348335 A1 | 12/2015 | Ramanujam | |
| 2016/0274591 A1* | 9/2016 | Bick | G05D 1/0027 |

OTHER PUBLICATIONS

"Master/slave (technology)—Wikipedia, the free encyclopedia", retrieved from https://en.wikipedia.org/wiki/Master/slave; as early as Jun. 2004.

Reese, C. "Refueling While Moving, Now a Reality", retrieved from http://transcondrivers.org/2016/01/16/refueling-while-moving-now-a-reality/; Jan. 2016.

"Refueling Tanks—Transfer Flow, Inc.—Aftermarket Fuel Tank Systems", retrieved from https://www.transferflow.com/fuel-tanks/refueling-tanks; as early as Jan. 2013.

"Refuel while driving?", retrieved from http://priuschat.com/threads/refuel-while-driving.136319/; Jan. 2014.

"Drafting (aerodynamics)—Wikipedia, the free encyclopedia", retrieved from https://en.wikipedia.org/wiki/Drafting; as early as Mar. 2004.

"Aerial refueling—Wikipedia, the free encyclopedia", retrieved from https://en.wikipedia.org/wiki/Aerial_refueling; as early as Apr. 2004.

Autonomous car—Wikipedia, the free encyclopedia, retrieved from https://en.wikipedia.org/wiki/Autonomous_car; as early as Jul. 2016.

"Record Breaking 85mph ReFuel of Nissan GT-R-Fifth Gear", retrieved from https://www.youtube.com/watch?v=08GrBs9gcnU; Apr. 23, 2013.

* cited by examiner

CONNECTION OF AN AUTONOMOUS VEHICLE WITH A SECOND VEHICLE TO RECEIVE GOODS

BACKGROUND

The present invention relates to autonomous vehicles, and more specifically to the connection of an autonomous vehicle with a second vehicle to receive goods while in motion.

An autonomous vehicle is a vehicle that is capable of sensing its environment and navigating without human input. Autonomous vehicles detect surroundings using computer vision, radar, global positioning system (GPS), lidar, and odometry. Autonomous vehicles have systems which are capable of analyzing sensory data to distinguish between different cars on the road.

In a proposed classification by The National Highway Traffic Safety Administration (NHTSA), vehicles are classified into the following levels:
  Level 0: The driver completely controls the vehicle at all times.
  Level 1: Individual vehicle controls are automated, such as electronic stability control or automatic braking.
  Level 2: At least two controls can be automated in unison, such as adaptive cruise control in combination with lane keeping.
  Level 3: The driver can fully cede control of all safety-critical functions in certain conditions. The car senses when conditions require the driver to retake control and provides a "sufficiently comfortable transition time" for the driver to do so.
  Level 4: The vehicle performs all safety-critical functions for the entire trip, with the driver not expected to control the vehicle at any time. As this vehicle would control all functions from start to stop, including all parking functions, it could include unoccupied cars.

The Society for Advanced Engineers (SAE) has created a system based on six different levels (ranging from driver assistance to fully automated systems). This classification system is based on the amount of driver intervention and attentiveness required, rather than the vehicle capabilities, although these are very closely related. The SAE classification system includes the following levels:
  Level 0: The driver completely controls the vehicle at all times.
  Level 1: Individual vehicle controls are automated, such as electronic stability control or automatic braking.
  Level 2: At least two controls can be automated in unison, such as adaptive cruise control in combination with lane keeping.
  Level 3: The driver can fully cede control of all safety-critical functions in certain conditions. The car senses when conditions require the driver to retake control and provides a "sufficiently comfortable transition time" for the driver to do so.
  Level 4: The vehicle performs all safety-critical functions for the entire trip, with the driver not expected to control the vehicle at any time. As this vehicle would control all functions from start to stop, including all parking functions, it could include unoccupied cars.
  Level 5: Other than setting the destination and starting the system, no human intervention is required. The automatic system can drive to any location where it is legal to drive.

SUMMARY

According to one embodiment of the present invention, a method of connecting a first autonomous vehicle with a second vehicle to control the second vehicle during the transfer of goods to the first autonomous vehicle while moving is disclosed. The method comprising the steps of: the first autonomous vehicle receiving a request from the second vehicle to connect to the second vehicle; the first autonomous vehicle initiating control over the second vehicle, such that the first autonomous vehicle synchronizes driving control with the second vehicle; the first autonomous vehicle initiating physical connection of the first autonomous vehicle with the second vehicle for transfer of the goods when the first and the second vehicles are in motion; after the physical connection between the first autonomous vehicle and the second vehicle is established, the first autonomous vehicle initiating transfer of the goods from the second vehicle to the first autonomous vehicle; and when the transfer of goods between the first autonomous vehicle and the second vehicle is complete, the first autonomous vehicle breaking the connection with the second vehicle and relinquishing control of the second vehicle.

According to another embodiment of the present invention, a computer program product for connecting a first autonomous vehicle with a second vehicle to control the second vehicle during the transfer of goods to the first autonomous vehicle while moving is disclosed. The computer program product comprising a computer comprising at least one processor, one or more memories, one or more computer readable storage media, the computer program product comprising a computer readable storage medium having program instructions embodied therewith. The program instructions executable by the computer to perform a method comprising: receiving, by the first autonomous vehicle, a request from the second vehicle to connect to the second vehicle; initiating, by the first autonomous vehicle, control over the second vehicle, such that the first autonomous vehicle synchronizes driving control with the second vehicle; initiating, by the first autonomous vehicle, physical connection of the first autonomous vehicle with the second vehicle for transfer of the goods when the first and the second vehicles are in motion; after the physical connection between the first autonomous vehicle and the second vehicle is established, initiating, by the first autonomous vehicle, transfer of the goods from the second vehicle to the first autonomous vehicle; and when the transfer of goods between the first autonomous vehicle and the second vehicle is complete, breaking, by the first autonomous vehicle, the connection with the second vehicle and relinquishing control of the second vehicle.

According to another embodiment of the present invention, a computer system for connecting a first autonomous vehicle with a second vehicle to control the second vehicle during the transfer of goods to the first autonomous vehicle while moving is disclosed. The computer system comprising a computer comprising at least one processor, one or more memories, one or more computer readable storage media having program instructions executable by the computer to perform the program instructions. The program instructions comprising: receiving, by the first autonomous vehicle, a request from the second vehicle to connect to the second vehicle; initiating, by the first autonomous vehicle, control over the second vehicle, such that the first autonomous vehicle synchronizes driving control with the second vehicle; initiating, by the first autonomous vehicle, physical connection of the first autonomous vehicle with the second vehicle for transfer of the goods when the first and the second vehicles are in motion; after the physical connection between the first autonomous vehicle and the second vehicle is established, initiating, by the first autonomous vehicle, transfer of the goods from the second vehicle to the first autonomous vehicle; and when the transfer of goods between the first autonomous vehicle and the second vehicle is complete, breaking, by the first autonomous vehicle, the connection with the second vehicle and relinquishing control of the second vehicle.

DETAILED DESCRIPTION

Figure 1:
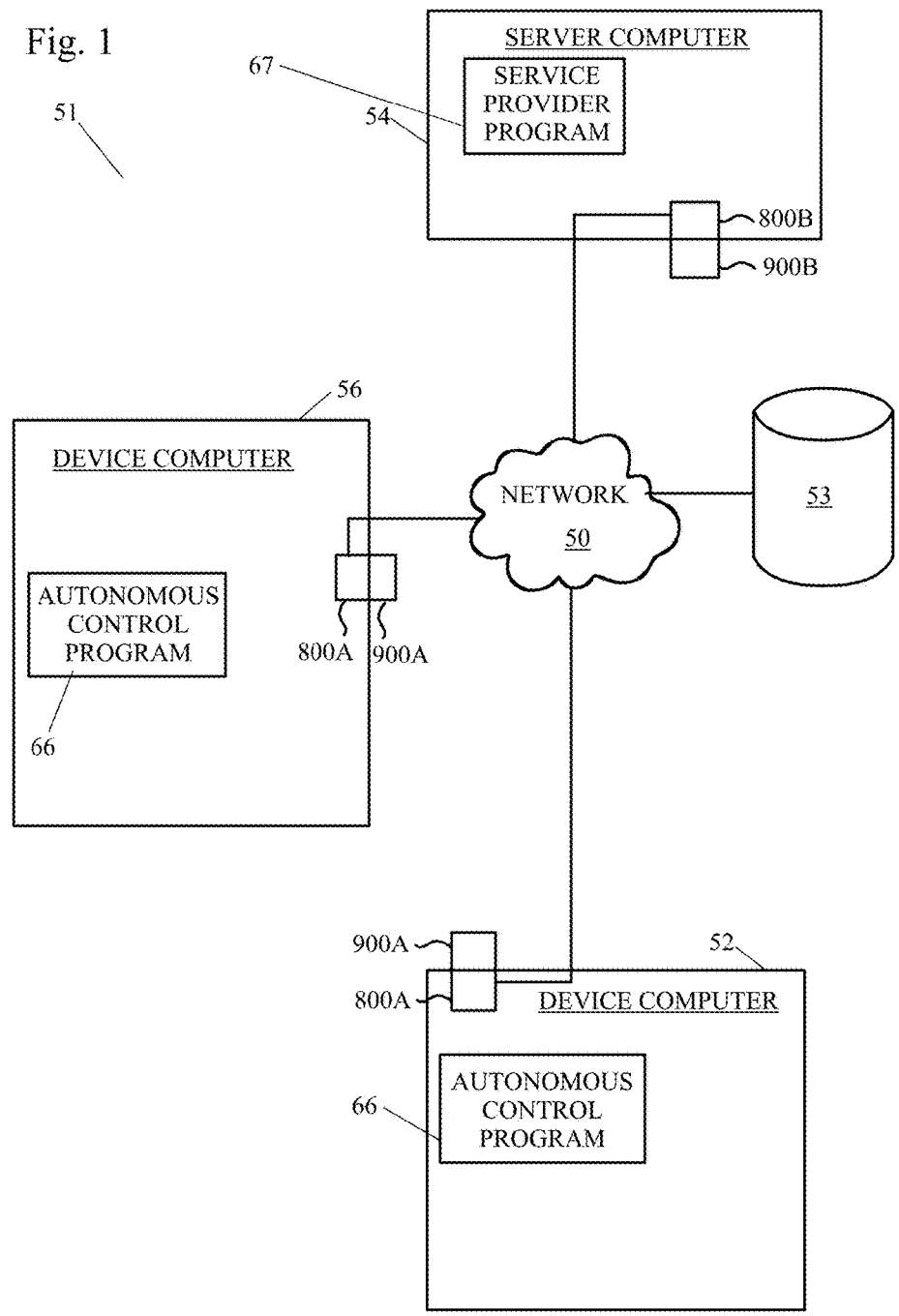
FIG. 1 depicts an exemplary diagram of a possible data processing environment in which illustrative embodiments may be implemented.

It will be recognized that in an embodiment of the present invention, the term autonomous car or vehicle refers to at least a level 4 or greater autonomous vehicle under the NHTSA system and at least a level 4 or greater in the SAE classification system FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, device computers 52, 56 storage unit 53, and server computer 54 connect to network 50. In other exemplary embodiments, network data processing system 51 may include additional device computers, storage devices, server computers, and other devices not shown.

Figure 4:
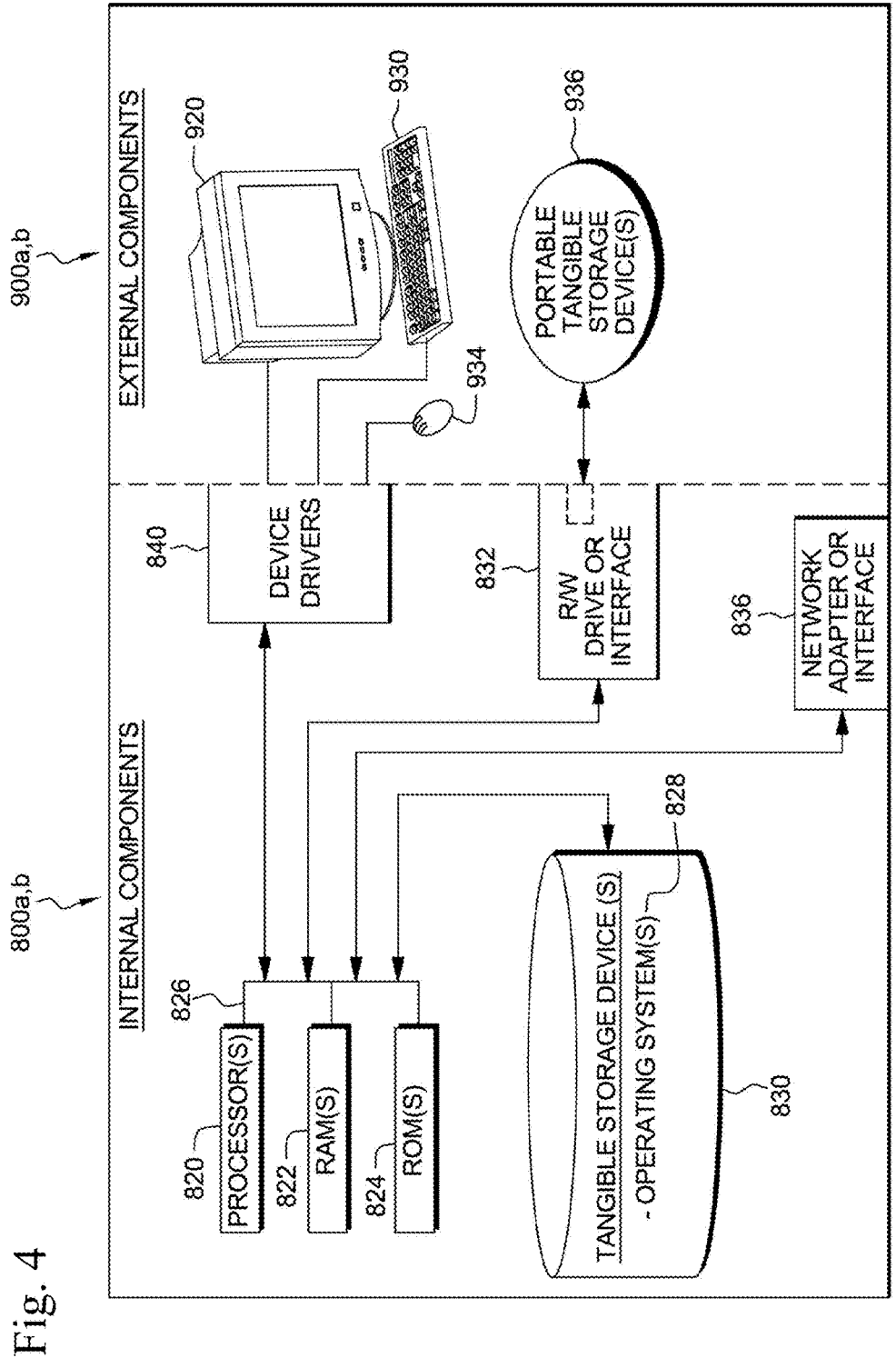
FIG. 4 illustrates internal and external components of a mobile device and a personal imaging device and a server computer in which illustrative embodiments may be implemented.

Device computers 52, 56 each include a set of internal components 800a and a set of external components 900a, further illustrated in FIG. 4. Each of the device computers 52, 56 may be, for example an autonomous vehicle of a level 3 or greater under SAE or NHTSA. Alternatively, device computer 52 may be for an autonomous vehicle of level 4 or greater and device computer 56 may be for a vehicle below level 3.

Device computers 52 and 56 may contain an interface. The interface may accept commands and data entry from a user or person remotely controlling the autonomous vehicle, for example information regarded the goods or services being requested. The interface can be, for example, a command line interface, a graphical user interface (GUI), or a web user interface (WUI). The device computers 52, 56 may include an autonomous control program 66. Device computer 52 is preferably present in a first autonomous vehicle and the device computer 56 is preferably present in a second vehicle. The first autonomous vehicle may be an autonomous vehicle. The second vehicle may also be an autonomous vehicle. The device computer 52 may communicate with device computer 56 through the network.

Server computer 54 includes a set of internal components 800b and a set of external components 900b illustrated in FIG. 4. Server computer 54 may contain an interface. The interface can be, for example, a command line interface, a graphical user interface (GUI), or a web user interface (WUI) through which a service provider program 67 may be accessed. The server computer 54 may also contain a server provider program 67. In the depicted example, server computer 54 provides information, such as boot files, operating system images, information regarding the delivery of the services and/or goods, and applications to the device computers 52, 56. Server computer 54 can compute the information locally or extract the information from other computers on network 50.

Program code and programs such as autonomous control program 66 and service provider program 67 may be stored on at least one of one or more computer-readable tangible storage devices 830 shown in FIG. 4, on at least one of one or more portable computer-readable tangible storage devices 936 as shown in FIG. 4, or on storage unit 53 connected to network 50, or may be downloaded to a computer, such as device computers 52, 56 or server computer 54, for use.

For example, program code and programs such as autonomous control program 66 may be stored on at least one of one or more storage devices 830 on server computer 54 and downloaded to device computers 52, 56 over network 50 for use on device computers 52, 56. Alternatively, server computer 54 can be a web server, and the program code, and programs such as autonomous control program 66 may be stored on at least one of the one or more storage devices 830 on server computer 54 and accessed on device computers— 52, 56. In other exemplary embodiments, the program code, and programs such as autonomous control program 66 may be stored on at least one of one or more computer-readable storage devices 830 on device computers 52, 56 or distributed between two or more servers.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

Figure 2:
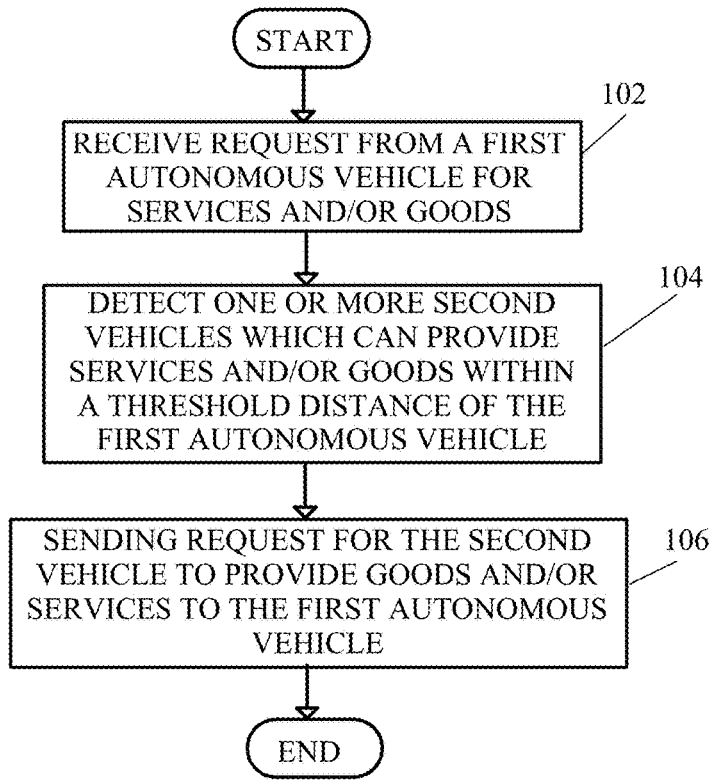
FIG. 2 shows a method of an autonomous vehicle requesting goods and/or services from a second vehicle.

FIG. 2 shows a method of a first autonomous vehicle requesting goods and/or services from a second vehicle.

In a first step, the server computer 54 receives a request from a first autonomous vehicle for services and/or goods (step 102). The services and/or goods, may be, but are not limited to, fuel, food, automobile parts, air pressure, medical emergency items such as bandages, ointments, or other first aid supplies etc . . . , or other items which are currently available for sale at gas station. The request may additionally include a location of the first autonomous vehicle and a unique vehicle identifier. The request may be sent to the server computer via a cellular network. The server computer may manage multiple vendors of goods and services or may manage a single vendor.

The server computer detects one or more second vehicles which can provide the services and/or goods within a threshold distance of the first autonomous vehicle (step 104), for example by the service provider program 67. The threshold distance may be conveyed by the user of the first autonomous vehicle or by the vendor of the goods and services which will dispatch the second vehicle to the first autonomous vehicle.

The server computer sends a request for the second vehicle to provide the goods and/or services to the first autonomous vehicle (step 106) and the method ends.

The request to the second vehicle preferably includes what services or goods, a geolocation of the first autonomous vehicle, the vehicle identifier of the first autonomous vehicle, information needed to establish proof of identity of the two vehicles, payment information and other information. Proof of either of the two vehicles may be carried out using PKI electronic signatures, client certificates, a one time use electronic token exchange or other methods. Periodic updates associated with the location of the first autonomous vehicle may be sent to the second vehicle during the course of travel of the second vehicle to the first autonomous vehicle. The updated information may include location, speed and destination.

After step 106, the server computer 54 may receive a message from either the second vehicle or the first autonomous vehicle when the transfer of goods and/or services to the first autonomous vehicle is complete.

Figure 3:
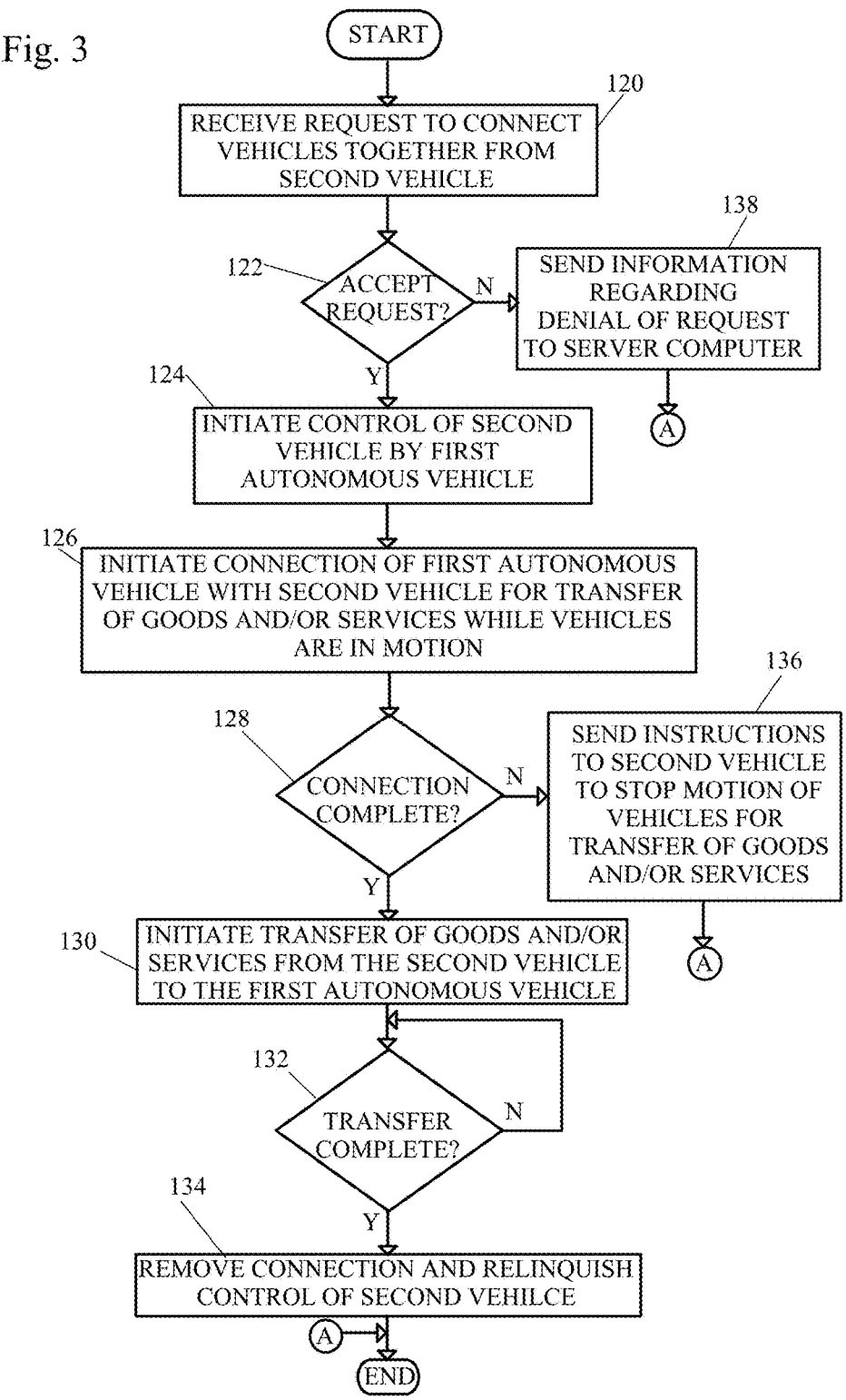
FIG. 3 shows a method of connecting the first autonomous vehicle with a second vehicle to control the second vehicle during the transfer of goods and/or services by the first autonomous vehicle.

FIG. 3 shows a method of connecting the first autonomous vehicle with a second vehicle to control the second vehicle during the transfer of goods and/or services by the first autonomous vehicle. The method of FIG. 3 takes place after the method of FIG. 2.

In a first step, an autonomous control program 66 of the first autonomous vehicle receives a request to connect from the second vehicle (step 120). The request and further communication between the first autonomous vehicle and the second vehicle may be through WiFi or a cellular network. The request preferably includes information regarding the goods and/or services to be provided to the first autonomous vehicle, the unique vehicle identifier in which the goods and/or services are to be provided to, as well as providing permission to the first autonomous vehicle to synchronize and take control of the second vehicle. In one embodiment, at a long range, the communication between the first autonomous vehicle and the second vehicle may be over a cellular type of network and switches to a short range technology such as WiFi or Bluetooth when within the appropriate range. In one embodiment, during the point of contact between the first autonomous vehicle and the second vehicle a data exchange between or through the physically linked contact between the two vehicles allows an establishment of the identity of the provider and receiver of goods.

If the first autonomous vehicle does not accept the request from the second vehicle (step 122), the autonomous control program 66 may send information regarding the denial of the request to the server computer 54 (step 138) and the method ends. The non-acceptance of the request may occur when the request information provided by the second vehicle does not match a request made by the first autonomous vehicle.

If the first autonomous vehicle accepts the request from the second vehicle (step 122), the first autonomous vehicle initiates control over the second vehicle (step 124), such that a processor of the first autonomous vehicle with the autonomous control program 66 has unidirectional control over the second vehicle and synchronizes control of the second vehicle with the first autonomous vehicle. The control may include, but is not limited to, speed, handling, steering, braking, transfer of goods, refueling and other aspects of driving the vehicle. It should be noted that for the first autonomous vehicle to accept the request from the second vehicle, the goods and/or services in the request as well as the unique vehicle identifier must match. It should also be noted that while the control of the second vehicle is unidirectional, the control is maintained within certain safety boundaries which are not exceeded. The safety boundaries may be established prior to the connection between the first and the second vehicle. For example, the first autonomous vehicle may control the speed of the second vehicle within a safety boundary, set to disallow the first autonomous vehicle from driving the second vehicle greater than 45 miles per hour as well as how close the second vehicle comes to the first autonomous vehicle.

The first autonomous vehicle initiates connection of the first autonomous vehicle with the second vehicle for services and/or goods transfer when the first and the second vehicles are in motion (step 126), for example by the autonomous control program 66. The initiation of the connection between the two vehicles may include instructions to both the first and the second vehicles regarding alignment of the vehicles, speed, and other factors to allow the transfer of services and/or goods. Sensors as well as computer vision, radar. GPS, lidar, and odometry may be used to monitor and determine whether the connection was successful between the two vehicles.

If the connection between the first and second vehicles is completed (step 128), the transfer of services and/or goods is initiated from the second vehicle to the first autonomous vehicle (step 130). The connection between the first and second vehicle is considered to be complete, for example, when the physical connection between the first and second vehicles has been secured, identities of the first and second vehicles are established and proven, payment method is verified, allowing the transfer of goods and/or services to begin without risk of the connection breaking or coming undone easily.

If the transfer of goods and/or services is not complete (step 132), the method returns to step 132. The determination of whether the transfer of goods and/or services is complete may be determined by autonomous control program 66 of the second vehicle providing the goods and/or services. In an alternate embodiment, the autonomous control program 66 of the first autonomous vehicle may determine whether the transfer of goods and/or services is complete.

If the transfer of goods and/or services is complete (step 132), the autonomous control program 66 removes connection between the first and second vehicles and relinquishes control of the second vehicle (step 134), and the method ends. The autonomous control program 66 of the first autonomous vehicle or the user of the first autonomous vehicle may send a notification to the server computer 54 regarding the completed service and/or goods transfer.

If the connection is not completed (step 128), the first autonomous vehicle sends instructions to the second vehicle to pull to the side of the road and stop motion for the transfer of the services and/or goods (step 136) and the method ends.

There may be a number of attempts within a specified time limit prior to the connection being considered to be incomplete. Once the vehicles have pulled to the side of the road and are no longer in motion, the first autonomous vehicle may initiate the transfer of services and/or goods and once the transfer is complete, a notification may be sent to the server computer 54 regarding the transfer of services and/or goods. The connection between the two vehicles may be impaired or limited by severe weather or damage to either of the two vehicles, requiring a halt of motion in order to complete the transfer.

It should be noted that while the first autonomous vehicle was chosen to control the transfer of services and/or goods, if the second vehicle is autonomous, the second vehicle may control the transfer of goods and/or services.

For example, when a first autonomous vehicle reaches a specific amount of fuel or battery charge, the user or the autonomous vehicle itself may request a refueling. The request may be sent to a server computer that manages multiple gas stations. The request includes the geolocation of the vehicle and a unique vehicle identifier. Based on the location of the first autonomous vehicle, the server computer obtains at least one gas station with a second vehicle which can recharge or deliver the fuel to the first autonomous vehicle. The second vehicle may be a manned vehicle (SAE levels 0-2 or NHTSA levels 1-2) or an autonomous vehicle (greater than level 3). The second vehicle is dispatched to the first autonomous vehicle to provide refueling or recharging.

When the second vehicle reaches the first autonomous vehicle, the second vehicle sends a request to the first autonomous vehicle regarding the refueling. The first autonomous vehicle accepts the request and controls the movement (speed, steering, braking, etc. . . . ) of the second vehicle, the connection between the first autonomous vehicle and the second vehicle, and the transfer of the fuel itself from the second vehicle to the first autonomous vehicle. Once the first autonomous vehicle is connected to the second vehicle while moving, transfer of fuel may be initiated by the first autonomous vehicle. The first autonomous vehicle may be connected to the front or the back of the vehicle depending on where the fuel tank is located. Once the transfer of fuel is complete, the connection between the two vehicles will be removed and the first autonomous vehicle relinquishes control of the second vehicle. A notification may be sent by the first autonomous vehicle or the second vehicle regarding the transfer of fuel or charge.

FIG. 4 illustrates internal and external components of device computer 52, 56 and server computer 54 in which illustrative embodiments may be implemented. In FIG. 4, device computer 52, 56 and server computer 54 include respective sets of internal components 800a, 800b and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, an autonomous control program 66 and service provider program 67 are stored on one or more of the computer-readable tangible storage devices 830 for execution by one or more of the processors 820 via one or more of the RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Autonomous control program 66 and service provider program 67 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Autonomous control program 66 and service provider program 67 can be downloaded to the device computer 52 and server computer 54 from an external computer via a network (for example, the Internet, a local area network or other, wide area network) and network adapter or interface 836. From the network adapter or interface 836, autonomous control program 66 and service provider program 67 are loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Autonomous control program 66 and service provider program 67 can be written in various programming languages including low-level, high-level, object-oriented or non object-oriented languages. Alternatively, the functions of an autonomous control program 66 and a service provider program 67 can be implemented in whole or in part by computer circuits and other hardware (not shown).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of connecting a first autonomous vehicle with a second vehicle to control the second vehicle during the transfer of goods to the first autonomous vehicle while moving comprising the steps of:
    the first autonomous vehicle receiving a request from the second vehicle to connect to the second vehicle;
    the first autonomous vehicle initiating control over the second vehicle, such that the first autonomous vehicle synchronizes driving control with the second vehicle;
    the first autonomous vehicle initiating physical connection of the first autonomous vehicle with the second vehicle for transfer of the goods when the first and the second vehicles are in motion;
    after the physical connection between the first autonomous vehicle and the second vehicle is established, the first autonomous vehicle initiating transfer of the goods from the second vehicle to the first autonomous vehicle; and
    when the transfer of goods between the first autonomous vehicle and the second vehicle is complete, the first autonomous vehicle breaking the connection with the second vehicle and relinquishing control of the second vehicle.

2. The method of claim 1, wherein the request by the second vehicle to connect to the first autonomous vehicle comprises: information regarding the goods to be provided to the first autonomous vehicle by the second vehicle; a vehicle identifier specific to the vehicle in which goods were requested; and authorization from the second vehicle to the first autonomous vehicle to synchronize and overtake control of the second vehicle.

3. The method of claim 1, wherein driving control further comprises: speed control of the second vehicle, steering of the second vehicle, distance between the first autonomous vehicle and the second vehicle, and braking of the second vehicle.

4. The method of claim 1, wherein the initiation of the connection between the first autonomous vehicle and the second vehicle comprises: instructions regarding alignment of the second vehicle relative to the first autonomous vehicle and speed to maintain by the first autonomous vehicle and the second vehicle.

5. The method of claim 1, wherein after the step of the first autonomous vehicle relinquishing control of the second vehicle further comprising the step of: the first autonomous vehicle sending a notification regarding the completed goods transfer to a server computer.

6. The method of claim 1, wherein the second vehicle is autonomous.

7. The method of claim 1, wherein prior to the step of the first autonomous vehicle receiving a request to connect to the second vehicle, the method comprising the step of the first autonomous vehicle sending a request regarding the goods needed.

8. The method of claim 1, wherein the goods are selected from a group consisting of:
fuel, first aid supplies, food, and battery charge.

9. A computer program product for connecting a first autonomous vehicle with a second vehicle to control the second vehicle during the transfer of goods to the first autonomous vehicle while moving, the first autonomous vehicle comprising a computer for executing the computer program product, the computer comprising at least one processor, one or more memories, one or more computer readable storage media, the computer program product comprising a computer readable storage medium having program instructions embodied therewith, the program instructions executable by the computer to perform a method comprising:
receiving, by the first autonomous vehicle, a request from the second vehicle to connect to the second vehicle;
initiating, by the first autonomous vehicle, control over the second vehicle, such that the first autonomous vehicle synchronizes driving control with the second vehicle;
initiating, by the first autonomous vehicle, physical connection of the first autonomous vehicle with the second vehicle for transfer of the goods when the first and the second vehicles are in motion;
after the physical connection between the first autonomous vehicle and the second vehicle is established, initiating, by the first autonomous vehicle, transfer of the goods from the second vehicle to the first autonomous vehicle; and
when the transfer of goods between the first autonomous vehicle and the second vehicle is complete, breaking, by the first autonomous vehicle, the connection with the second vehicle and relinquishing control of the second vehicle.

10. The computer program product of claim 9, wherein the request by the second vehicle to connect to the first autonomous vehicle comprises: information regarding the goods to be provided to the first autonomous vehicle by the second vehicle; a vehicle identifier specific to the vehicle in which goods were requested; and authorization from the second vehicle to the first autonomous vehicle to synchronize and overtake control of the second vehicle.

11. The computer program product of claim 9, wherein driving control further comprises: speed control of the second vehicle, steering of the second vehicle, distance between the first autonomous vehicle and the second vehicle, and braking of the second vehicle.

12. The computer program product of claim 9, wherein the initiation, by the first autonomous vehicle, of the connection between the first autonomous vehicle and the second vehicle comprises: instructions regarding alignment of the second vehicle relative to the first autonomous vehicle and speed to maintain by the first autonomous vehicle and the second vehicle.

13. The computer program product of claim 9, wherein after the step of the relinquishing control of the second vehicle further comprising the program instructions of sending, by the first autonomous vehicle a notification regarding the completed goods transfer to a server computer.

14. The computer program product of claim 9, wherein prior to the step of receiving, by the first autonomous vehicle, a request to connect to the second vehicle, the program instructions further comprising sending, by the first autonomous vehicle, a request regarding the goods needed.

15. The computer program product of claim 9, wherein the goods are selected from a group consisting of: first aid supplies, food, fuel and battery charge.

16. A computer system of a first autonomous vehicle for connecting a first autonomous vehicle with a second vehicle to control the second vehicle during the transfer of goods to the first autonomous vehicle while moving, the computer system of the first autonomous vehicle comprising a computer comprising at least one processor, one or more memories, one or more computer readable storage media having program instructions executable by the computer to perform a method comprising:
receiving, by the first autonomous vehicle, a request from the second vehicle to connect to the second vehicle;
initiating, by the first autonomous vehicle, control over the second vehicle, such that the first autonomous vehicle synchronizes driving control with the second vehicle;
initiating, by the first autonomous vehicle, physical connection of the first autonomous vehicle with the second vehicle for transfer of the goods when the first and the second vehicles are in motion;
after the physical connection between the first autonomous vehicle and the second vehicle is established, initiating, by the first autonomous vehicle, transfer of the goods from the second vehicle to the first autonomous vehicle; and
when the transfer of goods between the first autonomous vehicle and the second vehicle is complete, breaking, by the first autonomous vehicle, the connection with the second vehicle and relinquishing control of the second vehicle.

17. The computer system of claim 16, wherein the request by the second vehicle to connect to the first autonomous vehicle comprises: information regarding the goods to be provided to the first autonomous vehicle by the second vehicle; a vehicle identifier specific to the vehicle in which goods were requested; and authorization from the second vehicle to the first autonomous vehicle to synchronize and overtake control of the second vehicle.

18. The computer system of claim 16, wherein driving control further comprises:
   speed control of the second vehicle, steering of the second vehicle, distance between the first autonomous vehicle and the second vehicle, and braking of the second vehicle.

19. The computer system of claim 16, wherein the initiation, by the first autonomous vehicle, of the connection between the first autonomous vehicle and the second vehicle comprises: instructions regarding alignment of the second vehicle relative to the first autonomous vehicle and speed to maintain by the first autonomous vehicle and the second vehicle.

20. The computer system of claim 16, wherein prior to the step of receiving, by the first autonomous vehicle, a request to connect to the second vehicle, the program instructions further comprising sending, by the first autonomous vehicle, a request regarding the goods needed.

\* \* \* \* \*